US010530012B2

(12) United States Patent
Maeda et al.

(10) Patent No.: US 10,530,012 B2
(45) Date of Patent: Jan. 7, 2020

(54) METHOD FOR PRODUCING AN ELECTROCHEMICAL DEVICE

(71) Applicant: ZEON CORPORATION, Chiyoda-ku, Tokyo (JP)

(72) Inventors: Kouichirou Maeda, Tokyo (JP); Taku Matsumura, Tokyo (JP); Kunihito Arai, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 97 days.

(21) Appl. No.: 15/520,940

(22) PCT Filed: Oct. 23, 2015

(86) PCT No.: PCT/JP2015/079938
§ 371 (c)(1),
(2) Date: Apr. 21, 2017

(87) PCT Pub. No.: WO2016/080143
PCT Pub. Date: May 26, 2016

(65) Prior Publication Data
US 2017/0346130 A1 Nov. 30, 2017

(30) Foreign Application Priority Data

Nov. 18, 2014 (JP) .................................. 2014-233360
Apr. 24, 2015 (JP) .................................. 2015-088985

(51) Int. Cl.
*H01M 10/058* (2010.01)
*H01M 10/052* (2010.01)
*H01M 2/14* (2006.01)
*H01M 2/34* (2006.01)

(52) U.S. Cl.
CPC ........... *H01M 10/058* (2013.01); *H01M 2/14* (2013.01); *H01M 2/345* (2013.01); *H01M 2/348* (2013.01); *H01M 10/052* (2013.01)

(58) Field of Classification Search
CPC .... H01M 10/058; H01M 10/052; H01M 2/14; H01M 2/34
See application file for complete search history.

(56) References Cited

U.S. PATENT DOCUMENTS

| 5,167,995 | A | * | 12/1992 | Johnson | .................. B32B 27/06 428/41.3 |
| 7,358,007 | B1 | * | 4/2008 | Sawada | ............... H01M 2/0257 427/409 |
| 2004/0045597 | A1 | | 3/2004 | Kimijima et al. | |
| 2008/0226972 | A1 | * | 9/2008 | Kwag | .................. H01M 2/0207 429/121 |
| 2013/0157086 | A1 | | 6/2013 | Kawabe et al. | |

FOREIGN PATENT DOCUMENTS

| CN | 103173148 A | 6/2013 |
| JP | S60164587 A | 8/1985 |
| JP | H08157785 A | 6/1996 |
| JP | 2001093576 A | 4/2001 |
| JP | 2001176757 A | 6/2001 |
| JP | 2003151512 A | 5/2003 |
| JP | 2004006160 A | 1/2004 |
| JP | 2005126452 A | 5/2005 |
| JP | 4440573 B2 | 3/2010 |

OTHER PUBLICATIONS

Jun. 6, 2017, International Preliminary Report on Patentability issued in the International Patent Application No. PCT/JP2015/079938.
Apr. 26, 2018, Extended European Search Report issued by the European Patent Office in the corresponding European Patent Application No. 15861350.5.

* cited by examiner

*Primary Examiner* — Kenneth J Douyette
(74) *Attorney, Agent, or Firm* — Kenja IP Law PC

(57) ABSTRACT

The double-sided tape for fixing an electrode constituent body is used in an electrochemical device that houses in a pouch-type outer casing an electrode constituent body wherein a positive electrode member, a separator member and a negative electrode member are layered or wound. The double-sided tape comprises a surface having a pressure-sensitive adhesive for adhering to the electrode constituent body, and a surface having a heat-sensitive adhesive for adhering to the pouch-type outer casing.

9 Claims, No Drawings

METHOD FOR PRODUCING AN ELECTROCHEMICAL DEVICE

TECHNICAL FIELD

The present invention relates to a double-sided tape for fixing an electrode constituent body, more specifically to a double-sided tape for fixing an electrode constituent body, having heat-sensitive adhesiveness and pressure-sensitive adhesiveness, capable of preventing dropping of an electrode active material layer in an electrode and being used suitably for a pouch-type battery having excellent sealing performance in a tab portion, and a secondary battery in which an electrode constituent body is fixed with this double-sided tape.

BACKGROUND ART

Demand for an electrochemical device such as a lithium ion secondary battery having a high energy density and capable of being charged and discharged repeatedly has been rapidly increased by taking advantage of characteristics thereof. The lithium ion secondary battery is used in a field of a cellular phone, a notebook type personal computer, an electric car, or the like because of a relatively large energy density.

The lithium ion secondary battery is a secondary battery in which an electrode constituent body obtained by laminating or winding a positive electrode member, a separator member, and a negative electrode member is housed in an outer casing. In recent years, the lithium ion secondary battery has been spread widely, while a capacity thereof has become larger, and improvement of a capacity density has been required. Particularly, improvement of a weight density has been requested strongly. Therefore, due to a request for a lighter weight, a pouch-type battery obtained by enclosing an electrode constituent body in a container having a laminated film outer casing with a heat-sealed end has been proposed in place of a metal outer casing.

In the pouch-type battery using a laminated film outer casing, fixing is performed by inserting tabs which are metal plates for extracting electricity to the outside and are connected to a positive electrode current collector and a negative electrode current collector as a part of an electrode constituent body into an outer casing, and bonding the tabs to a heat-sealing portion of the outer casing closely, but the electrode constituent body itself is not fixed to the outer casing.

Here, conventionally, in a case of a small battery used for a portable electronic device, an electrode constituent body included in a laminated film outer casing has a small weight, and the electrode constituent body does not move easily when vibration is applied thereto from an outside. Therefore, a force applied to the tab portion does not change sealing performance.

However, a battery for a portable electronic device has increased the capacity thereof and the size thereof. Furthermore, in a large battery used for an electric car or the like, an electrode constituent body housed in a laminated film outer casing has a large weight, and therefore the electrode constituent body easily moves when vibration is applied thereto. Accordingly, the force applied to the tab portion is increased, adhesiveness between the tab portion and the outer casing is lowered, and sealing performance may be thereby lowered.

Patent Literature 1 has proposed use of an adhesive tape having an adhesive layer on one surface of a substrate for winding stop of a wound battery. However, the tape has no adhesiveness to a portion other than an adhesive surface, and is not suitable for fixing an electrode constituent body to an outer casing.

Patent Literatures 2 and 3 describe use of a double-sided pressure-sensitive adhesive tape having pressure-sensitive adhesive layers on both surfaces of a substrate for fixing an electrode constituent body to an outer casing in a battery. Patent Literature 3 has further proposed use of a releasable sheet on an adhesive surface of an electrode constituent body having a double-sided adhesive tape pasted thereon before the electrode constituent body is enclosed in order to prevent a problem such as occurrence of adhesion at an entrance when the electrode constituent body is enclosed in an outer casing of a battery. However, when the releasable sheet is peeled off and the electrode constituent body is bonded to the outer casing, air bubbles remain between the adhesive tape and the outer casing, an adhesive force is poor particularly after storage at a high temperature, and a capacity retention ratio of an obtained lithium ion secondary battery after storage at a high temperature is not sufficient.

Patent Literature 4 discloses an adhesive tape obtained by applying an acrylic or silicone adhesive to a film such as a biaxially oriented polypropylene film. However, both surfaces thereof are adhesive surfaces made of the same material, and therefore it is not possible to satisfy both preventing unwound of an electrode constituent body and fixing thereof to an outer casing.

CITATION LIST

Patent Literature

Patent Literature 1: JP 2005-126452 A
Patent Literature 2: JP 2003-151512 A
Patent Literature 3: JP 2001-93576 A
Patent Literature 4: JP 4440573 B2

SUMMARY OF INVENTION

Technical Problem

An object of the present invention is to provide a double-sided tape for fixing an electrode constituent body, capable of preventing unwound of an electrode constituent body and fixing the electrode constituent body to an outer casing even when an external force such as vibration is applied, and a secondary battery in which an electrode constituent body is fixed with this double-sided tape.

Solution to Problem

The present inventors made intensive studies, and have found that the above object can be achieved by using a double-sided tape having a heat-sensitive adhesive layer on one surface of a substrate and a pressure-sensitive adhesive layer on the other surface, and have completed the present invention.

That is, the present invention provides the following (1) to (9).

(1) A double-sided tape for fixing an electrode constituent body used for an electrochemical device in which an electrode constituent body obtained by laminating or winding a positive electrode member, a separator member, and a negative electrode member is housed in a pouch-type outer casing, including a surface containing a pressure-sensitive adhesive for adhesion to the electrode constituent body and a surface containing a heat-sensitive adhesive for adhesion to the pouch-type outer casing.

(2) The double-sided tape for fixing an electrode constituent body described in (1), in which an outermost layer or uppermost and lowermost surfaces of the electrode constituent body are formed of metal.

(3) The double-sided tape for fixing an electrode constituent body described in (1), in which the outermost layer or uppermost and lowermost surfaces of the electrode constituent body are formed of resin.

(4) The double-sided tape for fixing an electrode constituent body described in any one of (1) to (3), including a pressure-sensitive adhesive layer formed with the pressure-sensitive adhesive on one surface of a substrate, in which the pressure-sensitive adhesive layer is formed of an acrylic adhesive modified with alkyl (meth)acrylate and unsaturated carboxylic acid or a derivative thereof and/or a rubber-based adhesive.

(5) The double-sided tape for fixing an electrode constituent body described in any one of (1) to (3), including a heat-sensitive adhesive layer formed with the heat-sensitive adhesive on one surface of a substrate, in which the heat-sensitive adhesive layer is formed of a rubber-based adhesive or a modified polyolefin adhesive.

(6) The double-sided tape for fixing an electrode constituent body described in any one of (1) to (3), including a heat-sensitive adhesive layer formed with the heat-sensitive adhesive on one surface of a substrate and a pressure-sensitive adhesive layer formed with the pressure-sensitive adhesive on the other surface of the substrate, in which the substrate is formed of a polyolefin resin or a polyester, the pressure-sensitive adhesive layer is formed of an acrylic adhesive modified with alkyl (meth)acrylate and unsaturated carboxylic acid or a derivative thereof and/or a rubber-based adhesive, and the heat-sensitive adhesive layer is formed of a rubber-based adhesive.

(7) The double-sided tape for fixing an electrode constituent body described in any one of (1) to (6), in which a melting point or an adhesion temperature of a heat-sensitive adhesive layer formed with the heat-sensitive adhesive is lower than a thermal fusion temperature for sealing an opening of the pouch-type outer casing.

(8) The double-sided tape for fixing an electrode constituent body described in any one of (1) to (7), in which the heat-sensitive adhesive is a block polymer.

(9) A secondary battery in which the electrode constituent body is bonded and fixed to the pouch-type outer casing with the double-sided tape for fixing an electrode constituent body described in any one of (1) to (8).

Advantageous Effects of Invention

The double-sided tape for fixing an electrode constituent body according to the present invention can stop winding of an electrode constituent body, and can fix the electrode constituent body to a pouch-type outer casing even when an external force such as vibration is applied. In addition, a secondary battery in which the electrode constituent body is fixed with this double-sided tape can be provided.

DESCRIPTION OF EMBODIMENTS

Hereinafter, the double-sided tape for fixing an electrode constituent body according to the present invention will be described. The double-sided tape for fixing an electrode constituent body according to the present invention (hereinafter, also simply referred to as "double-sided tape") is a double-sided tape for fixing an electrode constituent body used for a secondary battery in which an electrode constituent body obtained by laminating or winding a positive electrode member, a separator member, and a negative electrode member is housed in a pouch-type outer casing, and includes a surface containing a pressure-sensitive adhesive for adhesion to the electrode constituent body and a surface containing a heat-sensitive adhesive for adhesion to the outer casing.

(Double-Sided Tape)

The double-sided tape of the present invention has a surface containing a pressure-sensitive adhesive for adhesion to an electrode constituent body (pressure-sensitive adhesive layer) and a surface containing a heat-sensitive adhesive for adhesion to a pouch-type outer casing (heat-sensitive adhesive layer). In addition, preferably, the pressure-sensitive adhesive layer is formed on one surface of a substrate, and the heat-sensitive adhesive layer is formed on the other surface of the substrate.

(Substrate)

A material constituting a substrate used for the double-sided tape of the present invention is not particularly limited. However, examples thereof include polyolefin such as polyethylene, polypropylene (PP), polyvinyl chloride, or ethylene-vinyl acetate copolymer (EVA); polyester such as polyethylene terephthalate (PET), polybutylene terephthalate (PBT), or polyethylene naphthalate (PEN); polyarylate; polyurethane; polycarbonate; polyamide; polyimide (PI); polyphenylene sulfide (PPS); polytetrafluoroethylene, and composites thereof. Among these materials, polypropylene having flexibility and stretchability is preferably used, and not-stretched polypropylene having more stretchability is more preferably used.

Examples of the polypropylene include a homo polypropylene which is a homopolymer of propylene (hereinafter, also abbreviated as homo PP), a random copolymer obtained by copolymerizing ethylene (hereinafter, also abbreviated to as EPC), and a block copolymer obtained by blending elastomer components of an ethylene-propylene copolymer at a molecular level during polymerization of polypropylene (hereinafter, also abbreviated to as block PP). The EPC resin has a melting point of about 140° C. The homo PP and the block PP have melting points of 160° C. to 165° C.

The thickness of a polyolefin film is not particularly limited, but is preferably from 10 to 100 μm in view of easiness of handling.

(Heat-Sensitive Adhesive)

The heat-sensitive adhesive constituting the heat-sensitive adhesive layer does not exhibit adhesiveness or has low adhesiveness at normal temperature, and is releasable easily. The heat-sensitive adhesive is not particularly limited as long as being an adhesive having a thermal fusion property without any harmful effect on battery performance, but preferably has a tack strength of less than 0.8 N at 25° C. and a tack strength of 0.8 N or more at 60° C. Here, the tack strength is a value measured using a probe tack tester. Specifically, an adhesive is applied in a thickness of 5 μm onto a PET film having a thickness of 50 μm, and the tack strength can be measured using a probe tack tester (TAC-1000 manufactured by Rhesca Co., Ltd.) using a SUS probe of 10 mmφ at a pressing speed of 1 mm/sec at a peeling speed of 10 mm/sec at a pressing pressure of 0.98 N/cm² at pressing time of 1 sec at a probe temperature of 25° C. or 60° C.

Examples of the kind of the heat-sensitive adhesive include a rubber-based adhesive, an acrylic adhesive, a polyolefin adhesive such as a modified polyolefin adhesive, a modified acrylic adhesive, and a silicone adhesive, having the above characteristics. Among these adhesives, a polyolefin adhesive such as a modified polyolefin adhesive, a modified acrylic adhesive, and a rubber-based adhesive are preferable, and a thermoplastic elastomer as a rubber-based adhesive is the most preferable.

Here, examples of the modified polyolefin adhesive include an adhesive mainly containing polyolefin modified with unsaturated carboxylic acid or an anhydride thereof, or a silane coupling agent.

Examples of the unsaturated carboxylic acid or an anhydride thereof include acrylic acid, methacrylic acid, maleic acid, maleic anhydride, citraconic acid, citraconic anhydride, itaconic acid, itaconic anhydride, ester compounds of monoepoxy compounds of derivatives of the acids and the acids, and reaction products of a polymer having a group capable of reacting with these acids in a molecule thereof and the acids. Metal salts thereof can be also used. Among these compounds, maleic anhydride is more preferably used. These compounds can be used singly or in mixture of two or more kinds thereof.

Examples of the silane coupling agent for modifying a polyolefin include vinyltriethoxysilane, methacryloyloxy trimethoxysilane, and γ-methacryloyloxy propyltriacetyloxy silane.

In addition, examples of the modified acrylic adhesive include an acrylic adhesive modified by using alkyl (meth) acrylate and unsaturated carboxylic acid or a derivative thereof. Note that here, "(meth)acrylic" means both "acrylic" and "methacrylic".

Examples of the rubber-based adhesive include an adhesive containing rubber such as butyl rubber, butadiene rubber, isoprene rubber, or EPDM, and a modified product thereof.

Examples of the thermoplastic elastomer include a copolymer of aromatic vinyl monomer and conjugated diene monomer. Specific examples of the copolymer of aromatic vinyl monomer and conjugated diene monomer include a diblock type block polymer such as a styrene-butadiene block copolymer or a styrene-isoprene block polymer; a triblock type block polymer such as a styrene-butadiene-styrene block polymer, a styrene-isoprene-styrene block polymer (SIS), a styrene-butadiene-isoprene block polymer, or a styrene-isobutylene-styrene block polymer (SIBS); a multi-block type styrene-containing block polymer such as a styrene-butadiene-styrene-butadiene block polymer, a styrene-isoprene-styrene-isoprene block polymer, a styrene-butadiene-isoprene-styrene block polymer, a styrene-butadiene-styrene-isoprene block polymer, or styrene-isobutylene-butadiene-styrene block polymer; hydrogenated products thereof; and partially hydrogenated products thereof. Among these compounds, a block polymer such as SIS or SIBS is more preferably used.

When the heat-sensitive adhesive layer is bonded to the pouch-type outer casing, it is necessary to reduce an influence of heat on a separator or the like in an electrode. Specifically, a melting point or an adhesion temperature of the heat-sensitive adhesive layer is required to be lower than a shut-off temperature of the separator. Furthermore, in the present invention, the pouch-type outer casing is preferably formed of a laminate material such as an aluminum laminate. However, the melting point or the adhesion temperature of the heat-sensitive adhesive layer is required to be lower than a thermal fusion temperature of a component used for lamination of the pouch-type outer casing.

In addition, when the heat-sensitive adhesive layer is bonded to the pouch-type outer casing, thermal fusion is preferably performed at a temperature equal to or lower than a melting point of a substrate. When the substrate has a low temperature thermal fusion property, it is also considered that the heat-sensitive adhesive layer is not required. However, in this case, in a step of applying and drying the pressure-sensitive adhesive, wrinkles are easily generated in the substrate or the substrate is easily stretched to cause poor dimensional stability disadvantageously. Therefore, it is necessary to dispose a heat-sensitive adhesive layer.

When thermal fusion is performed, it is preferable to further apply pressure in addition to the heat. Specifically, thermal fusion can be performed using a hot press machine or the like. Pressure to be applied is preferably 0.5 MPa or more and less than 2 MPa. Pressure of less than 0.5 MPa exhibits a small effect of pressure. Pressure of 2 MPa or more blocks a microporous portion of the separator in a secondary battery, so that battery performance may be thereby deteriorated.

An organic lubricant for imparting slipperiness of a film or an inorganic or organic antiblocking agent for preventing blocking may be added to the heat-sensitive adhesive layer in a range not lowering adhesiveness or performance of a battery.

(Pressure-Sensitive Adhesive)

The pressure sensitive adhesive constituting the pressure-sensitive adhesive layer is an adhesive exhibiting pressure-sensitive adhesiveness at normal temperature. The pressure-sensitive adhesive is not particularly limited as long as not having a bad influence on battery performance, but preferably has a tack strength of 0.8 N or more at 25° C. Note that a method for measuring the tack strength is similar to the above.

Examples of the kind of the pressure-sensitive adhesive include a rubber-based adhesive, an acrylic adhesive, and a silicone adhesive, having the above characteristics. Among these pressure-sensitive adhesives, the acrylic adhesive and the rubber-based adhesive are preferable.

Examples of the acrylic adhesive include an adhesive formed of an acrylic copolymer obtained by polymerizing a monomer component such as a main monomer imparting pressure-sensitive adhesiveness and capable of forming a polymer having a relatively low glass transition temperature (Tg), a comonomer imparting adhesiveness or a cohesive force and capable of forming a polymer having a relatively high Tg, and a functional group-containing monomer capable of forming a crosslinking point or improving adhesiveness.

Examples of the main monomer in the acrylic copolymer include alkyl acrylate such as ethyl acrylate, butyl acrylate, amyl acrylate, 2-ethylhexyl acrylate, or octyl acrylate; cycloalkyl acrylate such as cyclohexyl acrylate; aralkyl acrylate such as benzyl acrylate; an alkyl methacrylate such as butyl methacrylate or 2-ethylhexyl methacrylate; cycloalkyl methacrylate such as cyclohexyl methacrylate; and an aralkyl methacrylate such as benzyl methacrylate. Examples of the comonomer include a vinyl group-containing compound such as methyl acrylate, methyl methacrylate, ethyl methacrylate, vinyl acetate, vinyl propionate, vinyl ether, styrene, acrylonitrile, or methacrylonitrile.

Examples of the functional group-containing monomer include a carboxyl group-containing monomer such as acrylic acid, methacrylic acid, crotonic acid, maleic acid, fumaric acid, or itaconic acid; a hydroxyl group-containing monomer such as 2-hydroxyethyl (meth)acrylate, 2-hydroxypropyl (meth)acrylate, 4-hydroxybutyl (meth)acrylate, N-methylol acrylamide, or allyl alcohol; a tertiary amino group-containing monomer such as dimethylaminoethyl (meth)acrylate, diethylaminoethyl (meth) acrylate, or dimethylaminopropyl (meth)acrylate; an amide group-containing monomer such as acrylamide or methacrylamide; an N-substituted amide group-containing monomer such as N-methyl (meth)acrylamide, N-ethyl (meth) acrylamide, N-methoxymethyl (meth) acrylamide, N-ethoxymethyl (meth)acrylamide, N-t-butyl acrylamide, or N-octyl acrylamide; and an epoxy group-containing monomer such as glycidyl methacrylate. These monomers can be used singly or in mixture of two or more kinds thereof.

By selecting the kind of the above monomer component or a combination thereof appropriately, an acrylic copolymer having excellent pressure-sensitive adhesiveness, cohesion, and durability can be obtained.

Particularly, an acrylic adhesive modified with the alkyl (meth)acrylate, and unsaturated carboxylic acid exemplified as a carboxyl group-containing monomer in the above or a derivative thereof is preferable.

In this way, by selecting a polymer as a main component of the pressure-sensitive adhesive appropriately, a pressure-sensitive adhesive layer having any quality or characteristic according to an application can be formed.

Examples of the rubber-based adhesive include natural rubber, butadiene rubber, isoprene rubber, chloroprene rubber, styrene-butadiene copolymer rubber, ethylene-propylenediene copolymer rubber, and acrylonitrile-butadiene copolymer rubber. Specific examples of halogenated rubber include halogenated butyl rubber such as brominated butyl rubber or chlorinated butyl rubber, a halogenated product of isobutylene-paramethyl styrene copolymer (for example, brominated product), chloroprene rubber, epichlorohydrin rubber, chlorosulfonated polyethylene, chlorinated polyethylene, maleic acid modified chlorinated polyethylene, chlorinated acryl rubber, fluorine rubber, epoxidized acrylic rubber, and acrylic rubber obtained by copolymerizing halogen monomer. Among these rubbers, polybutadiene and polyisoprene having no polarity are preferable, and polybutadiene is particularly preferable because of dissolution resistance to an electrolytic solution.

A weight average molecular weight of a polymer constituting the pressure-sensitive adhesive is not particularly limited, but is, for example from 100,000 to 1,500,000, and preferably from 300,000 to 1,000,000. When the molecular weight is too small, a pressure-sensitive adhesive force or a cohesive force of the pressure-sensitive adhesive is poor. When the molecular weight is too large, the pressure-sensitive adhesive is hard, the adhesiveness is insufficient, and workability of bonding tends to be lowered. Tg of the polymer is not particularly limited, but is preferably −20° C. or lower. When Tg is too high, the pressure-sensitive adhesive is hard at some operating temperatures, and the adhesiveness cannot be maintained.

Both a crosslinking type adhesive and a non-crosslinking type adhesive can be used as the pressure-sensitive adhesive. The crosslinking type adhesive may contain a crosslinking agent in addition to the polymer. The crosslinking agent can be appropriately selected according to the kind of a crosslinkable functional group included in the pressure-sensitive adhesive. Examples thereof include an epoxy crosslinking agent, an isocyanate crosslinking agent, a metal chelate crosslinking agent, a metal alkoxide crosslinking agent, a metal salt crosslinking agent, an amine crosslinking agent, a hydrazine crosslinking agent, and an aldehyde crosslinking agent. These crosslinking agents can be used singly or in combination of two or more kinds thereof.

The pressure-sensitive adhesive may contain an additive such as an ultraviolet absorber, a tackifier, a softener (plasticizer), an anti-aging agent, a stabilizer, a filler, a pigment, a dye, or a silane coupling agent in addition to the above compounds, as necessary. Examples of the tackifier include rosin and a derivative thereof, polyterpene, a terpene phenol resin, a coumarone-indene resin, a petroleum resin, a styrene resin, and a xylene resin. Examples of the softener include a liquid polyether, a glycol ester, a liquid polyterpene, a liquid polyacrylate, a phthalate, and a trimellitate.

In the double-sided tape of the present invention, a release film may be laminated on the heat-sensitive adhesive layer and/or the pressure-sensitive adhesive layer in order to protect the heat-sensitive adhesive layer and/or the pressure-sensitive adhesive layer, as necessary. As the release film, a film conventionally used in a field of an adhesive tape or sheet can be used. Examples thereof include a film obtained by applying a release agent such as silicone onto a support formed of a paper material such as glassine paper, or a resin film such as polyethylene, polypropylene, or polyester.

An adhesive force between the double-sided tape of the present invention and the electrode constituent body is preferably 10 N/15 mm or more in order to obtain a sufficient adhesive force with the electrode constituent body due to the pressure-sensitive adhesive layer and to prevent peeling. In addition, in adhesion between the heat-sensitive adhesive and the outer casing, an adhesive force is preferably 10 N/15 mm or more at an adhesion temperature of 40° C. to 80° C.

Examples of a method for manufacturing the heat-sensitive adhesive layer and the pressure-sensitive adhesive layer in the double-sided tape include a co-extrusion molding method such as a T-die method or an inflation method, and a casting method. The casting method is preferable because a thin film heat-sensitive adhesive layer or thin film pressure-sensitive adhesive layer is easily formed.

When the thickness of the heat-sensitive adhesive layer is less than 1 μm, an adhesive force may be lowered because the thickness of the heat-sensitive adhesive layer is reduced by flowing of a melted resin due to heat and pressure of heat sealing. Accordingly, the larger thickness of the heat-sensitive adhesive layer is more advantageous in adhesion. However, when the thickness is too large, a relative volume of an entire battery with respect to the electrode constituent body is large, and therefore a capacity characteristic of the battery is lowered. The thickness of the heat-sensitive adhesive layer is preferably from 1 to 10 μm because of the above reason and an economic reason.

The thickness of the pressure-sensitive adhesive layer is preferably from 1 to 20 μm for the same reason as described above. The thickness of the pressure-sensitive adhesive layer is more preferably from 2 to 10 μm.

(Positive Electrode Member)

The positive electrode member used in the present invention is obtained by laminating a positive electrode active material layer on a current collector. The positive electrode member can be obtained by applying a positive electrode slurry containing a positive electrode active material, a positive electrode binder resin, a solvent used for manufacturing a positive electrode, and other components such as a water-soluble polymer or a conductive auxiliary agent optionally used onto a surface of the current collector, and drying the slurry. That is, by applying the positive electrode slurry onto the surface of the current collector and drying the slurry, the positive electrode active material layer is formed on the current collector.

Furthermore, by granulating a positive electrode slurry to obtain composite particles and subjecting the composite particles to compression molding on a current collector, the positive electrode active material layer may be formed on the current collector.

(Positive Electrode Active Material)

When the electrochemical device in the present invention is a lithium ion secondary battery, an active material to which a lithium ion can be doped or from which a lithium ion can be dedoped is used as the positive electrode active material, and is roughly classified into an active material formed of an inorganic compound and an active material formed of an organic compound.

Examples of the positive electrode active material formed of an inorganic compound include a transition metal oxide, a transition metal sulfide, and a lithium-containing composite metal oxide formed of lithium and a transition metal. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O$—$P_2O_5$, $MoO_3$, $V_2O_5$, and $V_6O_{13}$. Among these oxides, MnO, $V_2O_5$, $V_6O_{13}$, and $TiO_2$ are preferable due to cycle stability and capacity. Examples of the transition metal sulfide include $TiS_2$, $TiS_3$, amorphous $MoS_2$, and FeS. Examples of the lithium-containing composite metal oxide include a lithium-containing composite metal oxide having a layered structure, a lithium-containing composite metal oxide having a spinel structure, and a lithium-containing composite metal oxide having an olivine structure.

Examples of the lithium-containing composite metal oxide having a layered structure include lithium-containing cobalt oxide ($LiCoO_2$) (hereinafter, also referred to as "LCO"), lithium-containing nickel oxide ($LiNiO_2$), Co—Ni—Mn lithium composite oxide, Ni—Mn—Al lithium composite oxide, and Ni—Co—Al lithium composite oxide. Examples of the lithium-containing composite metal oxide having a spinel structure include lithium manganate ($LiMn_2O_4$) and $Li[Mn_{3/2}M_{1/2}]O_4$ (here, M is Cr, Fe, Co, Ni, Cu, or the like) in which a part of Mn is replaced with another transition metal. Examples of the lithium-containing composite metal oxide having an olivine structure include an olivine type lithium phosphate compound represented by $Li_xMPO_4$ (in the formula, M is at least one selected from the group consisting of Mn, Fe, Co, Ni, Cu, Mg, Zn, V, Ca, Sr, Ba, Ti, Al, Si, B, and Mo, $0 \leq X \leq 2$)

Examples of the organic compound include a conductive polymer such as polyacetylene or poly-p-phenylene. An iron oxide having poor electrical conductivity may be used as a positive electrode active material covered with a carbon material by presence of a carbon source material during reduction firing. These compounds may be those which have been subjected to partial elemental substitution. The positive electrode active material may be a mixture of the inorganic compound and the organic compound.

When the electrochemical device is a lithium ion capacitor, the positive electrode active material is only required to be able to support a lithium ion and an anion such as tetrafluoroborate reversibly. Specifically, an allotrope of carbon can be preferably used, and an electrode active material used in an electric double layer capacitor can be widely used. Specific examples of the allotrope of carbon include activated carbon, polyacene (PAS), carbon whisker, a carbon nanotube, and graphite.

The volume average particle diameter of the positive electrode active material is preferably from 1 to 50 μm, and more preferably from 2 to 30 μm from a viewpoint of reducing the blending amount of a positive electrode binder resin in preparing a positive electrode slurry and suppressing lowering in capacity of a battery, and from a viewpoint of making it easy to prepare a positive electrode slurry so as to have a viscosity suitable for applying the slurry and obtaining a uniform electrode.

(Positive Electrode Binder Resin)

Examples of the positive electrode binder resin include a resin such as polyethylene, polytetrafluoroethylene (PTFE), polyvinylidene fluoride (PVDF), a tetrafluoroethylene-hexafluoropropylene copolymer (FEP), a polyacrylic acid derivative, or a polyacrylonitrile derivative; and a soft polymer such as an acrylic soft polymer, a diene soft polymer, an olefin soft polymer, or a vinyl soft polymer. Note that the binder resin may be used singly or in combination of two or more kinds thereof at any ratio.

(Other Components)

Specific examples of the water-soluble polymer optionally used for the positive electrode slurry include a cellulose polymer such as carboxymethylcellulose, methylcellulose, ethylcellulose, or hydroxypropylcellulose, an ammonium salt or an alkali metal salt thereof, an alginic acid ester such as an alginic acid propylene glycol ester, an alginate such as sodium alginate, polyacrylic acid and a polyacrylate (or methacrylate) such as sodium polyacrylate (or methacrylate), polyvinyl alcohol, modified polyvinyl alcohol, poly-N-vinylacetamide, polyethyleneoxide, polyvinyl pyrrolidone, polycarboxylic acid, oxidized starch, starch phosphate, casein, various modified starch, chitin, and a chitosan derivative. Note that in the present invention, "(modified) poly" means "non-modified poly" or "modified poly". In addition, in the present invention, the water-soluble polymer means a polymer in which an undissolved fraction is less than 10.0% by weight when 0.5 g of the polymer is dissolved in 100 g of pure water at 25° C.

The conductive auxiliary agent optionally used in the positive electrode slurry is not particularly limited as long as having conductivity, but a particulate material having conductivity is preferable. Examples thereof include conductive carbon black such as furnace black, acetylene black, or Ketjen black; graphite such as natural graphite or artificial graphite; and a carbon fiber such as a polyacrylonitrile carbon fiber, a pitch carbon fiber, or a vapor grown carbon fiber.

(Solvent Used for Manufacturing Positive Electrode)

Either water or an organic solvent can be used as the solvent used for manufacturing a positive electrode. Examples of the organic solvent include an alicyclic hydrocarbon such as cyclopentane or cyclohexane; an aromatic hydrocarbon such as toluene or xylene; a ketone such as ethyl methyl ketone or cyclohexanone; an ester such as ethyl acetate, butyl acetate, γ-butyrolactone, or ε-caprolactone; an alkyl nitrile such as acetonitrile or propionitrile; an ether such as tetrahydrofuran or ethylene glycol diethyl ether; an alcohol such as methanol, ethanol, isopropanol, ethylene glycol, or ethylene glycol monomethyl ether; and an amide such as N-methylpyrrolidone or N,N-dimethylformamide. Among these solvents, N-methylpyrrolidone (NMP) is preferable. Note that the solvents may be used singly or in combination of two or more kinds thereof at any ratio. Among these solvents, water is preferably used as a solvent.

The amount of a solvent is only required to be adjusted such that the viscosity of the positive electrode slurry is suitable for application thereof. Specifically, the amount of a solvent is adjusted such that the solid concentration of the positive electrode slurry is preferably from 30 to 90% by weight, and more preferably from 40 to 80% by weight.

(Current Collector)

Examples of a material of the current collector used for the positive electrode member include metal, carbon, and a conductive polymer. Metal is preferably used. Examples of the metal include aluminum, platinum, nickel, tantalum, titanium, stainless steel, and an alloy. However, copper, aluminum, or an aluminum alloy is preferably used in view of conductivity and voltage resistance. In addition, when a high voltage resistance is required, high-purity aluminum disclosed in JP 2001-176757 A or the like can be suitably used. The current collector has a shape of a film or a sheet. The thickness thereof is appropriately selected according to intended use, but is preferably from 1 to 200 μm, more preferably from 5 to 100 μm, and still more preferably from 10 to 50 μm.

(Method for Manufacturing Positive Electrode Member)

The positive electrode member can be manufactured by forming a positive electrode active material layer on a current collector.

Examples of a method for forming a positive electrode active material layer on a current collector include a method for applying a positive electrode slurry onto a current collector and drying the slurry. The method for applying a positive electrode slurry onto a surface of a current collector is not particularly limited, but examples thereof include a doctor blade method, a dip method, a reverse roll method, a direct roll method, a gravure method, an extrusion method, and a brush coating method.

Examples of a drying method include drying with warm air, hot air, or low humidity air, vacuum drying, and a drying method by irradiation with a (far)infrared ray, an electron beam, or the like. Drying time is preferably from 5 minutes to 30 minutes. A drying temperature is preferably from 40 to 180° C.

After the positive electrode slurry is applied onto the surface of the current collector and is dried, the positive electrode active material layer is preferably subjected to a pressurization treatment, for example, using a mold press or a roll press, as necessary. A porosity of the positive electrode active material layer can be lowered by the pressurization treatment. The porosity is preferably 5% or more, more preferably 7% or more, preferably 30% or less, and more preferably 20% or less. When the porosity is too small, it is difficult to obtain a high volume capacity, and the positive electrode active material layer is easily peeled off from the current collector. When the porosity is too large, a charge efficiency and a discharge efficiency are lowered.

Furthermore, when the positive electrode active material layer contains a curable polymer, it is preferable to cure a polymer after the positive electrode active material layer is formed.

Incidentally, when a positive electrode slurry is granulated to obtain composite particles, the composite particles may be molded into a sheet shape, and then may be laminated on a current collector. However, it is preferable to form a positive electrode active material layer by a method for subjecting composite particles to direct pressure molding such as roll pressure molding on a current collector.

(Separator Member)

Examples of a material of a separator constituting the separator member include a microporous film or a nonwoven fabric containing a polyolefin resin such as polyethylene or polypropylene, or an aromatic polyamide resin; and a porous resin coating containing inorganic ceramic powder. Specific examples thereof include a microporous film formed of a polyolefin (polyethylene, polypropylene, polybutene, polyvinyl chloride) resin, a resin of a mixture thereof, or a resin of a copolymer thereof; a microporous film formed of a resin such as polyester including polyethylene terephthalate, polycycloolefin, polyether sulfone, polyamide, polyimide, polyimide amide, polyaramide, nylon, or polytetrafluoroethylene; a product obtained by weaving a polyolefin fiber or a non-woven fabric thereof; and an assembly of insulating material particles. Among these materials, a polyolefin resin or polyester is preferably used. A microporous film formed of a polyolefin resin is more preferable because the film thickness of the entire separator can be reduced, and an active material ratio in a lithium ion secondary battery can be raised to increase capacity per volume.

The thickness of the separator is preferably from 0.5 to 40 μm, more preferably from 1 to 30 μm, and still more preferably from 1 to 25 μm from a viewpoint of reducing an internal resistance due to the separator in a lithium ion secondary battery and from a viewpoint of excellent workability in manufacturing a lithium ion secondary battery.

(Negative Electrode Member)

The negative electrode member used in the present invention is obtained by laminating a negative electrode active material layer on a current collector. The negative electrode member can be obtained by applying a negative electrode slurry containing a negative electrode active material, a negative electrode binder resin, a solvent used for manufacturing a negative electrode, and other components such as a water-soluble polymer or a conductive auxiliary agent optionally used onto a surface of the current collector, and drying the slurry. That is, by applying the negative electrode slurry onto the surface of the current collector and drying the slurry, the negative electrode active material layer is formed on the current collector.

Furthermore, by granulating a negative electrode slurry to obtain composite particles and subjecting the composite particles to compression molding on a current collector, the negative electrode active material layer may be formed on the current collector.

(Negative Electrode Active Material)

When the electrochemical device in the present invention is a lithium ion secondary battery, examples of the negative electrode active material include a carbonaceous material such as amorphous carbon, graphite, natural graphite, meso carbon microbeads, or a pitch carbon fiber; a conductive polymer such as polyacene; a metal such as silicon, tin, zinc, manganese, iron, or nickel, and an alloy thereof; oxides or sulfates of the metals or alloys; metal lithium; a lithium alloy such as Li—Al, Li—Bi—Cd, or Li—Sn—Cd; a lithium transition metal nitride; and silicon. Also, as the negative electrode active material, a product obtained by attaching a conductive agent on a surface of particles of the negative electrode active material, for example, by a mechanical modifying method may be used. Furthermore, the negative electrode active material may be used singly or in combination of two or more kinds thereof at any ratio.

The particle diameter of a particle of the negative electrode active material is usually appropriately selected in consideration of the other constituent components of the electrochemical device. Particularly, the 50% volume cumulative diameter of particles of the negative electrode active material is preferably from 1 to 50 μm, and more preferably from 15 to 30 μm from a viewpoint of improvement of battery characteristics such as an initial efficiency, load characteristics, or cycle characteristics.

The content of the negative electrode active material in the negative electrode active material layer is preferably from 90 to 99.9% by weight, and more preferably from 95 to 99% by weight from a viewpoint of increasing the capacity of a lithium ion secondary battery and improving flexibility of a negative electrode and a binding property between the current collector and the negative electrode active material layer.

(Negative Electrode Binder Resin)

As the negative electrode binder resin, for example, a resin similar to the positive electrode binder resin may be used. Examples thereof include a resin such as polyethylene, a tetrafluoroethylene-hexafluoropropylene copolymer (FEP), a polyacrylic acid derivative, or a polyacrylonitrile derivative; and a soft polymer such as an acrylic soft polymer, a diene soft polymer, an olefin soft polymer, or a vinyl soft polymer. Note that the binder resin may be used singly or in combination of two or more kinds thereof at any ratio.

(Other Components)

As the water-soluble polymer and the conductive auxiliary agent optionally used for the negative electrode slurry, the water-soluble polymer and the conductive auxiliary agent which can be used for the above positive electrode slurry can be used, respectively.

(Solvent Used for Manufacturing Negative Electrode)

Either water or an organic solvent may be used as the solvent used for manufacturing a negative electrode. Examples of the organic solvent include an alicyclic hydrocarbon such as cyclopentane or cyclohexane; an aromatic hydrocarbon such as toluene or xylene; a ketone such as ethyl methyl ketone or cyclohexanone; an ester such as ethyl acetate, butyl acetate, γ-butyrolactone, or ε-caprolactone; an alkyl nitrile such as acetonitrile or propionitrile; an ether such as tetrahydrofuran or ethylene glycol diethyl ether; an alcohol such as methanol, ethanol, isopropanol, ethylene glycol, or ethylene glycol monomethyl ether; and an amide such as N-methylpyrrolidone or N,N-dimethylformamide. Among these solvents, N-methylpyrrolidone (NMP) is preferable. Note that the solvents may be used singly or in combination of two or more kinds thereof at any ratio. Among these solvents, water is preferably used as a solvent.

The amount of a solvent is only required to be adjusted such that the viscosity of the negative electrode slurry is suitable for application thereof. Specifically, the amount of a solvent is adjusted such that the solid concentration of the negative electrode slurry is preferably from 30 to 90% by weight, and more preferably from 40 to 80% by weight.

(Current Collector)

Examples of a material of the current collector used for the negative electrode include metal, carbon, and a conductive polymer. Metal is preferably used. Examples of the metal include copper, platinum, nickel, tantalum, titanium, stainless steel, and an alloy. Among these metals, copper is preferably used in view of conductivity. The current collector has a shape of a film or a sheet. The thickness thereof is appropriately selected according to intended use, but is preferably from 1 to 200 µm, more preferably from 5 to 100 µm, and still more preferably from 10 to 50 µm.

(Method for Manufacturing Negative Electrode Member)

The negative electrode member can be manufactured by forming a negative electrode active material layer on a current collector.

Examples of a method for forming a negative electrode active material layer on a current collector include a method for applying a negative electrode slurry onto a current collector and drying the slurry.

The method for applying a negative electrode slurry onto a surface of a current collector is not particularly limited, but examples thereof include a doctor blade method, a dip method, a reverse roll method, a direct roll method, a gravure method, an extrusion method, and a brush coating method.

Examples of a drying method include drying with warm air, hot air, or low humidity air, vacuum drying, and a drying method by irradiation with a (far)infrared ray, an electron beam, or the like. Drying time is preferably from 5 minutes to 30 minutes. A drying temperature is preferably from 40 to 180° C.

In addition, after the negative electrode slurry is applied onto the surface of the current collector and is dried, the negative electrode active material layer is preferably subjected to a pressurization treatment, for example, using a mold press or a roll press, as necessary. A porosity of the negative electrode active material layer can be lowered by the pressurization treatment. The porosity is preferably 5% or more, more preferably 7% or more, preferably 30% or less, and more preferably 20% or less. When the porosity is too large, it is difficult to obtain a high volume capacity, and the negative electrode active material layer is easily peeled off from the current collector. Also, when the porosity is too small, a rate characteristic is lowered.

Furthermore, when the negative electrode active material layer contains a curable polymer, it is preferable to cure a polymer after the negative electrode active material layer is formed.

The thickness of the negative electrode active material layer is not particularly limited, but is usually from 5 to 1000 µm, preferably from 20 to 500 µm, and more preferably from 30 to 300 µm.

Incidentally, when composite particles are obtained from a negative electrode slurry, the composite particles may be molded into a sheet shape, and then may be laminated on a current collector. However, it is preferable to form a negative electrode active material layer by a method for subjecting composite particles to direct pressure molding such as roll pressure molding on a current collector.

(Lithium Ion Secondary Battery)

For example, a lithium ion secondary battery using the double-sided tape of the present invention is manufactured by preparing an electrode constituent body, putting the electrode constituent body to which the double-sided tape of the present invention has been bonded in a pouch-type outer casing, and sealing the pouch-type outer casing.

Specifically, a positive electrode member and a negative electrode member are overlaid with a separator member interposed therebetween. The resulting product is wound or folded according to a battery shape to obtain an electrode constituent body in a form of a wound body, a laminated body, or the like. Subsequently, the double-sided tape of the present invention is pasted on an outermost layer or uppermost and lowermost surfaces of the electrode constituent body for preventing unwound. At this time, the double-sided tape is pasted such that the surface bonded to the electrode constituent body is a pressure-sensitive adhesive layer. Incidentally, the outermost layer or the uppermost and lowermost surfaces of the electrode constituent body are formed of a current collector constituting the positive electrode member or the negative electrode member (metal), or a separator member (resin).

Note that it is necessary that a positive electrode lead and a negative electrode lead which are thin metal plates for extracting electricity to the outside are connected in advance, or a tab is directly connected to the positive electrode member and the negative electrode member in the electrode constituent body respectively. When the leads are connected, the leads are required to be connected to a metal plate tab which is a member to be heat-sealed with a pouch-type outer casing.

Then, the electrode constituent body on which the double-sided tape has been pasted is housed in the pouch-type outer casing as a battery container. Here, in the present invention, a material of the battery container (pouch-type outer casing) is a laminated film made of a polyethylene or polypropylene resin, having a heat sealing property in the innermost layer and including an aluminum foil layer. The battery container including the tab except for a part of the pouch-type outer casing as an inlet for injecting an electrolytic solution is heat-sealed.

Subsequently, by applying heat to the plate-shaped pouch-type outer casing housing the electrode constituent body on which the double-sided tape has been pasted with a method of crimping a heating element at a predetermined temperature from the top and bottom of the plate for a predetermined time, or the like, the heat-sensitive adhesive layer of the double-sided tape is bonded to an inner surface of the outer casing. That is, the pouch-type outer casing is bonded to the electrode constituent body with the double-sided tape. The temperature at which the pouch-type outer casing is bonded to the electrode constituent body with the double-sided tape is preferably lower than a temperature at which the opening of the pouch-type outer casing is sealed as described below, and is preferably from 80 to 100° C.

Furthermore, by injecting an electrolytic solution and sealing the opening of the pouch-type outer casing with heat, a lithium ion secondary battery is obtained. The temperature for sealing the opening of the pouch-type outer casing is usually from 120 to 150° C.

(Electrolytic Solution)

Examples of an electrolytic solution used for a lithium ion secondary battery include a nonaqueous electrolytic solution obtained by dissolving a supporting electrolyte in a nonaqueous solvent. As the supporting electrolyte, a lithium salt is preferably used. Examples of the lithium salt include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among these lithium slats, $LiPF_6$, $LiClO_4$, and $CF_3SO_3Li$ which are easily dissolved in a solvent and exhibit a high dissociation degree are preferable. These lithium salts may be used singly or in combination of two or more kinds thereof at any ratio. Use of a supporting electrolyte having a higher dissociation degree makes a lithium ion conductivity higher. Thus, the lithium ion conductivity can be adjusted with the kind of the supporting electrolyte.

The concentration of the supporting electrolyte in the electrolytic solution is preferably from 0.5 to 2.5 mol/L according to the kind of the supporting electrolyte. The supporting electrolyte having a too high or too low concentration may reduce the ion conductivity.

The nonaqueous solvent is not particularly limited as long as being able to dissolving the supporting electrolyte. Examples of the nonaqueous solvent include a carbonate such as dimethyl carbonate (DMC), ethylene carbonate (EC), diethyl carbonate (DEC), propylene carbonate (PC), butylene carbonate (BC), or methylethyl carbonate (MEC); an ester such as γ-butyrolactone or methyl formate; an ether such as 1,2-dimethoxy ethane or tetrahydrofuran; a sulfur-containing compound such as sulfolane or dimethyl sulfoxide; and an ionic liquid also used as a supporting electrolyte. Among these solvents, a carbonate is preferable because of a high dielectric constant and a wide stable potential region. The nonaqueous solvents may be used singly or in combination of two or more kinds thereof at any ratio. In general, a nonaqueous solvent having a lower viscosity makes a lithium ion conductivity higher, and a nonaqueous solvent having a higher dielectric constant makes the solubility of a supporting electrolyte higher. However, there is a trade-off relation therebetween. Accordingly, it is preferable to use a nonaqueous solvent by adjusting the lithium ion conductivity with the kind of a solvent or a mixing ratio thereof. In addition, a product obtained by replacing all the hydrogen atoms or a part thereof in a nonaqueous solvent with fluorine atoms may be used partially or as a whole.

In addition, the electrolytic solution may contain an additive. Examples of the additive include a carbonate such as vinylene carbonate (VC); a sulfur-containing compound such as ethylene sulfite (ES); and a fluorine-containing compound such as fluoroethylene carbonate (FEC). The additives may be used singly or in combination of two or more kinds thereof at any ratio.

EXAMPLES

Hereinafter, the present invention will be described specifically by showing Examples. However, the present invention is not limited to the following Examples, but can be performed by modification in a range not departing from the abstract of the present invention and a scope equal thereto. Note that "%" and "part" indicating the amount in the following description are based on the weight unless otherwise specified.

In Examples and Comparative Examples, a peel strength, a capacity retention ratio after a vibration test, and a capacity retention ratio after storage at a high temperature were evaluated as follows.

(Peel Strength)

Double-sided tapes obtained in Examples and Comparative Examples were each cut into a width of 15 mm. Side surfaces of electrode constituent bodies were pasted on an aluminum foil, a copper foil, and a separator made of PP, and 180° peel strength was measured using a tension tester at a rate of 50 mm/min. Table 1 indicates results.

In addition, each of outer casing side surfaces of double-sided tapes obtained in Examples and Comparative Examples 3, 4, and 6 was crimped to an inner surface of an outer casing on a hot plate at 80° C. Cooling was performed, and then a peel strength thereof was measured similarly. Table 1 indicates results.

An outer casing side surface of a double-sided tape obtained in Comparative Example 5 was immersed in a mixed solvent of ethylene carbonate and ethylmethyl carbonate (ethylene carbonate/ethylmethyl carbonate=3/7 in weight ratio) at normal temperature for one minute. Immediately after that, the outer casing side surface was crimped to an inner surface of an outer casing on a hot plate at 80° C., and the mixed solvent was evaporated. Then, cooling was performed, and a peel strength was measured similarly. Table 1 indicates results.

(Capacity Retention Ratio after Vibration Test)

Each of lithium ion secondary batteries obtained in Examples and Comparative Examples was subjected to a charge-discharge test for repeating a cycle of charging the lithium ion secondary battery to 4.2 V by a constant current method at a charging rate of 0.1 C at 60° C., and then discharging the lithium ion secondary battery to 3.0 V at a discharging rate of 0.1 C five times. The fifth discharge capacity was used as an initial capacity.

Subsequently, the lithium ion secondary battery was fixed to a sieve having an inner diameter of 200 mm, and was vibrated with a Ro-Tap sieve shaker for one hour. Thereafter, the lithium ion secondary battery was subjected to a charge-discharge test similar to the above, and a discharge capacity after the vibration test was measured. A ratio of the discharge capacity after the vibration test with respect to the initial discharge capacity was determined as a capacity retention ratio. A larger value of the capacity retention ratio indicates a smaller reduction in capacity due to the vibration test. Table 1 indicates results.

(Capacity Retention Ratio after Storage at a High Temperature)

A lithium ion secondary battery the initial capacity of which had been checked was charged to 4.2 V, and was stored in an environment of 60° C. for 30 days. Subsequently, the lithium ion secondary battery was subjected to the vibration test in a similar manner to the above, and then a discharge capacity thereof was measured. This discharge capacity was used as a discharge capacity after storage at a high temperature, and a ratio of the discharge capacity after storage at a high temperature with respect to the initial discharge capacity was calculated. A larger value of the ratio indicates a better high temperature storage characteristic.

Example 1

(Manufacturing Double-Sided Tape)

As a substrate of the double-sided tape, a homo PP film having a thickness of 20 μm was used. A rubber-based adhesive (mixture of 60 parts by weight of a butadiene rubber (product name "Nipol BR1220" manufactured by Zeon Corporation) and 40 parts by weight of a styrene-isoprene-styrene block polymer (product name "Quintac 3620" manufactured by Zeon Corporation)) as a heat-sensitive adhesive was cast on one surface of the substrate such that a heat-sensitive adhesive layer had a thickness of 4 μm, and was dried at 60° C. to form the heat-sensitive adhesive layer.

Then, a butyl acetate solution as a pressure-sensitive adhesive was applied onto the other surface of the substrate such that a pressure-sensitive adhesive layer had a thickness of 4 μm, and was dried to form the pressure-sensitive adhesive layer. Here, as the pressure-sensitive adhesive, a crosslinking agent-containing acrylic adhesive composition formed of 100 parts by weight of acrylate copolymer [weight average molecular weight (Mw): 500,000] using 90 parts by weight of butyl acrylate and 10 parts by weight of acrylic acid as monomer components, and 2 parts by weight of trimethylolpropane tolylene diisocyanate (crosslinking agent) was used.

(Manufacturing Positive Electrode Member)

100 parts of $LiCoO_2$ as a positive electrode active material, 2.0 parts of acetylene black (AB35, powdery Denka Black manufactured by Denka Company Limited=number particle diameter: 35 nm, specific surface area: 68 $m^2/g$) as a conductive auxiliary agent, 2.0 parts of a fluorine-containing polymer mixed polyvinylidene fluoride (1:1 mixture of KYNARHSV900 and KYNAR720 manufactured by Arkema K.K.) as a positive electrode binder resin, and an appropriate amount of NMP were stirred with a planetary mixer to prepare a positive electrode slurry composition.

Aluminum foil having a thickness of 15 μm was prepared as a current collector. The positive electrode slurry composition was applied onto both surfaces of the aluminum foil such that the application amount after drying was 25 $mg/cm^2$, was dried at 60° C. for 20 minutes and at 120° C. for 20 minutes, and then was subjected to a heat treatment at 150° C. for two hours to obtain a positive electrode raw material.

This positive electrode raw material was rolled with a roll press to manufacture a sheet-shaped positive electrode active material layer formed of a positive electrode member having a density of 3.9 $g/cm^3$ and the aluminum foil. This positive electrode member was cut into a width of 48 mm and a length of 50 cm, and was connected to an aluminum lead as a positive electrode lead.

(Manufacturing Negative Electrode Member)

100 parts of spherical artificial graphite (particle diameter=12 μm) as a negative electrode active material, one part of a styrene-butadiene rubber (particle diameter=180 nm, glass transition temperature=−40° C.) as a negative electrode binder resin, one part of carboxymethylcellulose as a thickening agent, and an appropriate amount of water were stirred with a planetary mixer to prepare a negative electrode slurry composition.

Copper foil having a thickness of 15 μm was prepared as a current collector. The negative electrode slurry composition was applied onto both surfaces of the copper foil such that the application amount after drying was 10 $mg/cm^2$, was dried at 60° C. for 20 minutes and at 120° C. for 20 minutes, and then was subjected to a heat treatment at 150° C. for two hours to obtain a negative electrode raw material.

This negative electrode raw material was rolled with a roll press to manufacture a sheet-shaped negative electrode member formed of a negative electrode active material layer having a density of 1.8 $g/cm^3$ and the copper foil. This negative electrode member was cut into a width of 50 mm and a length of 52 cm, and was connected to a nickel lead as a negative electrode lead.

(Manufacturing Lithium Ion Secondary Battery)

The resulting sheet-shaped positive electrode member and the sheet-shaped negative electrode member were wound using a core having a diameter of 20 mm with a separator member interposed therebetween to obtain a wound body as an electrode constituent body. As the separator member, a polypropylene microporous film having a thickness of 20 μm was used. The wound body was compressed from one direction at a speed of 10 mm/sec until the thickness became 4.5 mm. When the wound body was seen from an axial direction of the core, the shape thereof was approximately elliptical. In this ellipse, a ratio of a long diameter with respect to a short diameter was 7.7.

Also, a 3:7 (weight) mixture of ethylene carbonate and methylethyl carbonate was mixed with 5% by weight fluoroethylene carbonate. Lithium hexafluorophosphate was dissolved therein so as to obtain a concentration of 1 mol/litter, and 2 vol % vinylene carbonate was further added thereto to prepare a nonaqueous electrolytic solution.

The pressure-sensitive adhesive layer side of the double-sided tape cut into 45 mm×50 mm was caused to face the outermost layer of the wound body, the pressure-sensitive adhesive layer side was pasted on the outermost layer, and winding thereof was stopped. Thereafter, the resulting product was housed in a predetermined aluminum laminate case as a pouch-type outer casing. Then, the negative electrode lead and the positive electrode lead were disposed at predetermined positions. Thereafter, heat was applied such that the temperature of the opening of the case was 120° C., and the opening was sealed except for an electrolytic solution injection inlet having a width of 1 mm. Subsequently, by applying heat to the pouch-type outer casing housing the electrode constituent body on which the double-sided tape had been pasted with a heat press machine at 1 MPa at 80°

C., the heat-sensitive adhesive layer of the double-sided tape was bonded to an inner surface of the pouch-type outer casing. That is, the pouch-type outer casing was bonded to the electrode constituent body with the double-sided tape.

Then, 3.2 g of a nonaqueous electrolytic solution was injected thereinto. Thereafter, the opening was sealed to complete a winding type pouch cell lithium ion secondary battery. The resulting pouch-type battery had a width of 35 mm, a height of 48 mm, and a thickness of 5 mm.

Example 2

A double-sided tape and a lithium ion secondary battery were manufactured in a similar manner to Example 1 except that a pressure-sensitive adhesive formed of 100 parts by weight of a natural rubber (adhesive component), 40 parts by weight of a terpene resin (tackifying resin), 30 parts by weight of a petroleum resin (tackifying resin), and an anti-aging agent (trade name "Sumilizer NW" manufactured by Sumitomo Chemical Co., Ltd.) was used as a pressure-sensitive adhesive in place of the crosslinking agent-containing acrylic adhesive composition in Example 1.

Example 3

A double-sided tape and a lithium ion secondary battery were manufactured in a similar manner to Example 1 except that a styrene-isoprene-styrene block polymer (SIS) was used as a heat-sensitive adhesive in place of the rubber adhesive and a butadiene rubber (product name "Nipol BR1220" manufactured by Zeon Corporation) was used as a pressure-sensitive adhesive in place of the crosslinking agent-containing acrylic adhesive composition.

Example 4

A double-sided tape and a lithium ion secondary battery were manufactured in a similar manner to Example 1 except that a styrene-isobutylene-styrene block polymer (SIBS) was used as a heat-sensitive adhesive in place of the rubber adhesive and a butadiene rubber (product name "Nipol BR1220" manufactured by Zeon Corporation) was used as a pressure-sensitive adhesive in place of the crosslinking agent-containing acrylic adhesive composition.

Example 5

A double-sided tape and a lithium ion secondary battery were manufactured in a similar manner to Example 1 except that polypropylene modified with maleic anhydride was used as a heat-sensitive adhesive in place of the rubber adhesive and a butadiene rubber (product name "Nipol BR1220" manufactured by Zeon Corporation) was used as a pressure-sensitive adhesive in place of the crosslinking agent-containing acrylic adhesive composition.

Comparative Example 1

A double-sided tape and a lithium ion secondary battery were manufactured in a similar manner to Example 1 except that a heat-sensitive adhesive layer was not formed in manufacturing the double-sided tape.

Comparative Example 2

A double-sided tape and a lithium ion secondary battery were manufactured in a similar manner to Example 2 except that a heat-sensitive adhesive layer was not formed in manufacturing the double-sided tape.

Comparative Example 3

A double-sided tape was manufactured in a similar manner to Example 1 except that a heat-sensitive adhesive layer was not formed and a pressure-sensitive adhesive layer was formed with a butadiene rubber (product name "Nipol BR1220" manufactured by Zeon Corporation) as a pressure-sensitive adhesive on both surfaces of a substrate in manufacturing the double-sided tape.

Using the resulting tape (double-sided adhesive tape) having the pressure-sensitive adhesive layers formed on both surfaces, in manufacturing a lithium ion secondary battery, one pressure-sensitive adhesive layer of the double-sided pressure-sensitive adhesive tape was pasted on an electrode constituent body, and then a peeling tape was pasted on the other pressure-sensitive adhesive layer of the double-sided tape. Subsequently, the electrode constituent body was housed in an aluminum laminate case. Thereafter, the peeling tape was peeled, and the aluminum laminate case was bonded to the electrode constituent body with the double-sided pressure-sensitive adhesive tape. The lithium ion secondary battery was manufactured in a similar manner to Example 1 except that the lithium ion secondary battery was manufactured in this way.

Comparative Example 4

A double-sided tape was manufactured in a similar manner to Example 1 except that a pressure-sensitive adhesive layer was not formed and a heat-sensitive adhesive layer was formed with a styrene-isoprene-styrene block polymer (SIS) as a heat-sensitive adhesive on both surfaces of a substrate in manufacturing the double-sided tape.

Using the resulting tape (double-sided heat-sensitive tape) having the heat-sensitive adhesive layers formed on both surfaces, in manufacturing a lithium ion secondary battery, the double-sided heat-sensitive tape was disposed in the center of an electrode constituent body, and the four corners of the double-sided heat-sensitive tape were fixed (temporarily fixed) to the electrode constituent body with an imide tape such that one of the heat-sensitive adhesive layers was in contact with the electrode constituent body. Thereafter, the electrode constituent body with the double-sided heat-sensitive tape was housed in an aluminum laminate case. After the electrode constituent body was housed, a temperature of 80° C. and a pressure of 1 MPa were applied to the electrode constituent body, and the electrode constituent body was bonded to the case with the double-sided heat-sensitive tape interposed therebetween. The lithium ion secondary battery was manufactured in a similar manner to Example 1 except that the lithium ion secondary battery was manufactured in this way.

Comparative Example 5

A double-sided tape was manufactured in a similar manner to Example 1 except that an adhesive layer exhibiting an adhesive force after being in contact with an electrolytic solution was formed with oriented polystyrene exhibiting an adhesive force after being in contact with an electrolytic solution in place of forming a heat-sensitive adhesive layer, and a butadiene rubber (product name "Nipol BR1220" manufactured by Zeon Corporation) was used as a pressure-sensitive adhesive in place of the crosslinking agent-containing acrylic adhesive composition in manufacturing the double-sided tape.

Using the resulting double-sided tape, in manufacturing a lithium ion secondary battery, the pressure-sensitive adhesive layer of the double-sided tape was pasted on an electrode constituent body, and winding thereof was stopped. Thereafter the resulting product was housed in an aluminum laminate case. Then, the negative electrode lead and the positive electrode lead were disposed at predetermined positions. Thereafter, heat was applied such that the temperature of the opening of the case was 120° C., and the opening was sealed except for an electrolytic solution injection inlet having a width of 1 mm. Then, by injecting 3.2 g of a nonaqueous electrolytic solution from the electrolytic solution injection inlet, the adhesive layer exhibiting an adhesive force by being in contact with an electrolytic solution in the double-sided tape was bonded to an inner surface of a pouch-type outer casing. That is, the pouch-type outer casing was bonded to the electrode constituent body with the double-sided tape.

Thereafter, the electrolytic solution injection inlet was sealed to complete a pouch-type lithium ion secondary battery.

Comparative Example 6

A double-sided tape and a lithium ion secondary battery were manufactured in a similar manner to Example 5 except that a plastic outer can was used in place of the aluminum laminate case. In manufacturing a lithium ion secondary battery, a pressure-sensitive adhesive layer of the double-sided tape was bonded to an electrode constituent body, and then the bonded product was housed in the plastic outer can. Subsequently, the outer can was placed on a hot plate heated to 80° C. such that the heat-sensitive adhesive layer was on the hot plate side, and was heated for 40 seconds.

TABLE 1

| | | Ex. 1 | Ex. 2 | Ex. 3 | Ex. 4 | Ex. 5 | Comp. Ex. 1 |
|---|---|---|---|---|---|---|---|
| Adhesive on a side of outer casing | | Rubber adhesive (heat-sensitive adhesive) | Rubber adhesive (heat-sensitive adhesive) | SIS (heat-sensitive adhesive) | SIBS (heat-sensitive adhesive) | Polypropylene modified with maleic anhydride (heat-sensitive adhesive) | None |
| Adhesive on a side of electrode constituent body | | Crosslinking agent-containing acrylic adhesive composition (pressure-sensitive adhesive) | Natural rubber (pressure-sensitive adhesive) | Butadiene rubber (pressure-sensitive adhesive) | Butadiene rubber (pressure-sensitive adhesive) | Butadiene rubber (pressure-sensitive adhesive) | Crosslinking agent-containing acrylic adhesive composition (pressure-sensitive adhesive) |
| Outer casing | | Laminated film | Laminated film | Laminated film | Laminated film | Laminated film | Laminated film |
| Peeling strength | Copper foil (N/15 mm) | 25 | 28 | 35 | 35 | 35 | 25 |
| | Aluminum foil (N/15 mm) | 32 | 28 | 34 | 34 | 34 | 32 |
| | Separator (N/15 mm) | 26 | 24 | 38 | 38 | 38 | 26 |
| | Outer casing (N/15 mm) | 18 | 18 | 30 | 35 | 10 | — |
| Capacity retention ratio after vibration test | | 98% | 98% | 100% | 100% | 85% | 60% |
| Capacity retention ratio after storage at high temperature | | 95% | 95% | 98% | 98% | 80% | 50% |

| | | Comp. Ex. 2 | Comp. Ex. 3 | Comp. Ex. 4 | Comp. Ex. 5 | Comp. Ex. 6 |
|---|---|---|---|---|---|---|
| Adhesive on a side of outer casing | | None | Butadiene rubber (pressure-sensitive adhesive) | SIS (heat-sensitive adhesive) | Oriented polystyrene (adhesive exhibiting adhesive force after being in contact with electrolytic solution) | Polypropylene modified with maleic anhydride (heat-sensitive adhesive) |
| Adhesive on a side of electrode constituent body | | Natural rubber (pressure-sensitive adhesive) | Butadiene rubber (pressure-sensitive adhesive) | SIS (heat-sensitive adhesive) | Butadiene rubber (pressure-sensitive adhesive) | Butadiene rubber (pressure-sensitive adhesive) |
| Outer casing | | Laminated film | Laminated film | Laminated film | Laminated film | Plastic can |
| Peeling strength | Copper foil (N/15 mm) | 28 | 35 | 30 | 35 | 35 |
| | Aluminum foil (N/15 mm) | 28 | 34 | 31 | 34 | 34 |

TABLE 1-continued

| | | | | | |
|---|---|---|---|---|---|
| Separator (N/15 mm) | 24 | 38 | 31 | 38 | 38 |
| Outer casing (N/15 mm) | — | 31 | 30 | 23 | 7 |
| Capacity retention ratio after vibration test | 75% | 98% | 75% | 98% | 70% |
| Capacity retention ratio after storage at high temperature | 50% | 60% | 70% | 50% | 75% |

As Table 1 indicates, a double-sided tape for fixing an electrode constituent body used for an electrochemical device in which an electrode constituent body obtained by laminating or winding a positive electrode member, a separator member, and a negative electrode member is housed in a pouch-type outer casing, including a surface containing a pressure-sensitive adhesive for adhesion to the electrode constituent body and a surface containing a heat-sensitive adhesive for adhesion to the outer casing had an excellent peel strength, and a lithium ion secondary battery using this double-sided tape had an excellent capacity retention ratio after a vibration test and an excellent capacity retention ratio after storage at a high temperature (Examples 1 to 5).

When a heat-sensitive adhesive layer was not formed, a capacity retention ratio after a vibration test and a capacity retention ratio after storage at a high temperature were poor (Comparative Examples 1 and 2).

When a double-sided adhesive tape was used, an aluminum laminate case could not be in contact with an electrode constituent body without a gap with a pressure-sensitive adhesive force of the double-sided pressure-sensitive adhesive tape, and air bubbles remained partially. Deterioration of the adhesive force after storage at a high temperature became significant due to the air bubbles, and a capacity retention ratio after storage at a high temperature was largely reduced (Comparative Example 3).

When a double-sided heat-sensitive tape was used, the film thickness around an imide tape was larger than that of any other portion due to an influence of the imide tape used for fixing (temporarily fixing) the double-sided heat-sensitive tape, a pressure cannot be imparted to the double-sided heat-sensitive tape uniformly, and an original adhesive force was not obtained. Therefore, a capacity retention ratio after a vibration test and a capacity retention ratio after storage at a high temperature were low (Comparative Example 4).

When a double-sided tape having a pressure-sensitive adhesive layer on one surface and an adhesive layer formed of oriented polystyrene on the other surface was used, a large portion of the adhesive layer formed of oriented polystyrene was eluted into an electrolytic solution after storage at a high temperature, an adhesive force was lowered, so that a capacity retention ratio after storage at a high temperature was low (Comparative Example 5).

When a plastic outer can was used, unlike the case where the laminate case was used, a pressure could not be imparted during bonding, and therefore the adhesive force was small. A capacity retention ratio after a vibration test was low because of absence of a sufficient adhesive force. On the other hand, an electrode was expanded, and a frictional force acting between the outer can and the electrode constituent body was increased after storage at a high temperature. Therefore, a capacity retention ratio after storage at a high temperature was higher than a capacity retention ratio after a vibration test (before storage at a high temperature) (Comparative Example 6).

The invention claimed is:

1. A method for producing an electrochemical device in which an electrode constituent body obtained by laminating or winding a positive electrode member, a separator member, and a negative electrode member is housed in a pouch-type outer casing, comprising:
   a step of fixing the electrode constituent body and the pouch-type outer casing by using a double-sided tape via the application of pressure of 0.5 MPa or more and less than 2 MPa at a temperature lower than 120° C., wherein the double-sided tape includes:
   a first surface provided with a thickness of from 1 to 20 μm and containing a pressure-sensitive adhesive having a tack strength of 0.8 N or more at 25° C. for adhesion to the electrode constituent body; and
   a second surface provided with a thickness of from 1 to 10 μm and containing a heat-sensitive adhesive having a tack strength of less than 0.8 N at 25° C. and 0.8 N or more at 60° C. for adhesion to the pouch-type outer casing.

2. The method according to claim 1, wherein an outermost layer or uppermost and lowermost surfaces of the electrode constituent body are formed of metal.

3. The method according to claim 1, wherein an outermost layer or uppermost and lowermost surfaces of the electrode constituent body are formed of resin.

4. The method according to claim 1, comprising a pressure-sensitive adhesive layer formed with the pressure-sensitive adhesive on one surface of a substrate, wherein
   the pressure-sensitive adhesive layer is formed of an acrylic adhesive modified with alkyl (meth)acrylate and unsaturated carboxylic acid or a derivative of unsaturated carboxylic acid and/or a rubber-based adhesive.

5. The method according to claim 1, comprising a heat-sensitive adhesive layer formed with the heat-sensitive adhesive on one surface of a substrate, wherein
   the heat-sensitive adhesive layer is formed of a rubber-based adhesive or a modified polyolefin adhesive.

6. The method according to claim 1, comprising:
   a heat-sensitive adhesive layer formed with the heat-sensitive adhesive on one surface of a substrate; and
   a pressure-sensitive adhesive layer formed with the pressure-sensitive adhesive on the other surface of the substrate, wherein
   the substrate is formed of a polyolefin resin or a polyester,
   the pressure-sensitive adhesive layer is formed of an acrylic adhesive modified with alkyl (meth)acrylate and unsaturated carboxylic acid or a derivative of unsaturated carboxylic acid and/or a rubber-based adhesive, and
   the heat-sensitive adhesive layer is formed of a rubber-based adhesive.

7. The method according to claim 1, wherein a melting point or an adhesion temperature of a heat-sensitive adhesive layer formed with the heat-sensitive adhesive is lower than a thermal fusion temperature for sealing an opening of the pouch-type outer casing.

8. The method according to claim 1, wherein the heat-sensitive adhesive is a block polymer.

9. A secondary battery, wherein the electrode constituent body is bonded and fixed to the pouch-type outer casing with the double-sided tape for fixing an electrode constituent body by the method according to claim 1.

* * * * *